Aug. 16, 1966 W. A. DEPNER 3,267,225
ROTARY SWITCH SHAFT AND SUPPORT STRUCTURE
Filed Sept. 3, 1965

INVENTOR
WILLIAM A. DEPNER
BY
ATTY.

United States Patent Office 3,267,225
Patented August 16, 1966

3,267,225
ROTARY SWITCH SHAFT AND SUPPORT STRUCTURE
William A. Depner, Naperville, Ill., assignor to Automatic Electric Laboratories, Inc., Northlake, Ill., a corporation of Delaware
Filed Sept. 3, 1965, Ser. No. 484,913
3 Claims. (Cl. 200—11)

This invention relates to electromagnetic rotary switches of the step-by-step type.

In the manufacture of step-by-step rotary switches, care must be taken to prevent the wiper assembly, carried by the center rotor shaft, from having too much axial play along the shaft as the wiper assembly rotates thereabout. If axial play is present the wiper assembly may shift back and forth on the shaft and produce undesirable results, such as: misalignment of the wiper carried by the wiper assembly with respect to the stationary contacts on the contact bank, thereby causing unnecessary wear of parts, high voltage breakdown, or erratic switch operation.

In the present fabricating procedure of such switches, an attempt is made to keep the rotary shaft and rotor parts within small tolerances to reduce the side play when the switch is assembled. This however proves to be expensive and troublesome, and in many cases still does not prevent the side play sufficiently to eliminate the above mentioned undesirable results.

Accordingly it is an object of this invention to provide a step-by-step rotary switch that will substantially eliminate the aforementioned undesirable results found in present step-by-step rotary switches.

Another object of this invention is to provide a new and improved step-by-step rotary switch that will allow one to adjust the axial play of the wiper assembly along the rotary shaft.

Still another object of this invention is to provide a step-by-step rotary switch that will be more economical to produce because of a reduction in the manufacturing tolerances.

A feature of this invention is a rotary stepping switch having locking means, such as a self threading lock nut, which can be manually tightened or loosened to provide axial pressure against a T bracket which in turn presses against the wiper assembly of the switch to adjust the axial play of the wiper assembly along the rotor shaft.

Other objects and features of the invention will become more apparent by reference to the following description taken in conjunction with the accompanying drawings of which:

Figure 1:
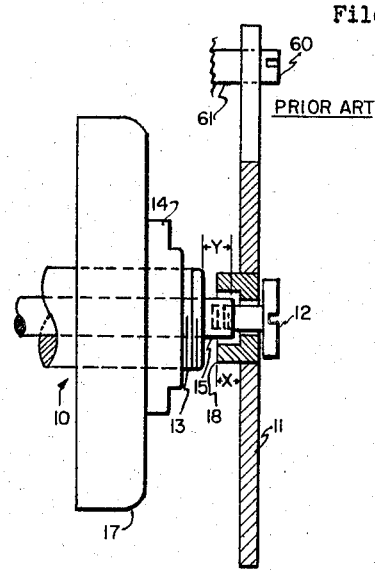
FIG. 1 is a top view, in part, of a detail of a rotary stepping switch used in the prior art.

Referring now to FIG. 1, this figure illustrates, by way of example, the technique typically used in the prior art. More particularly, the detail shown in this figure is a portion of the rotary electromagnetic stepping switch shown in FIG. 3 of the article entitled "Stepping Switches For Use in Industry" in the January 1963 issue of the Automatic Electric Technical Journal, vol. 8, No. 5. It can be seen from FIG. 1, that wiper assembly 10 comprises a wiper assembly shaft 13 which rotates about rotor shaft 15. Hub nut 14 holds drum 17 and wipers (not shown) in place on wiper assembly shaft 13. T-bracket 11 has been provided, to support the free end of rotor shaft 15 and to prevent excessive axial play of wiper assembly 10 along the rotor shaft which remains stationary upon operation of the switch. T-bracket 11, which is attached to the contact bank (not shown) at one end by screws, such as 60, extending through mounting posts such a 61, has on its other end an undercut bushing 18 that fits over rotor shaft 15 and is made so that it is within a specified distance from rotating wiper assembly shaft 13. T-bracket 11 is held in place by screw 12 which extends into rotor shaft 15, and which has a tendency to loosen from shock or vibration. In order to accomplish the task of eliminating excessive axial play in the switch, distance X must be a specific amount less than distance Y to allow wiper assembly 10 to rotate freely, yet not have too much axial play along rotor shaft 15.

This technique requires that T-bracket 11, undercut bushing 18, rotor shaft 15 and wiper assembly shaft 13 be made within small tolerances. Any variation in any of the above-mentioned parts may cause excessive axial play to occur. If it does occur, it will be transferred to the wipers of the switch, which in turn will not mate correctly with the stationary contacts located on bank assembly, such as 21, shown in FIG. 2. This irregular cut-in of the wipers may cause high voltage breakdowns or erratic switching which may reduce the life of the switch.

Also, in the switch of FIG. 1, no adjustment may be made to increase or decrease the axial play of the wiper assembly along the rotor shaft. This again is a disadvantage because after a switch has been operated for a period of time its structure may change and axial play may increase causing the undesirable results mentioned above.

Figure 2:
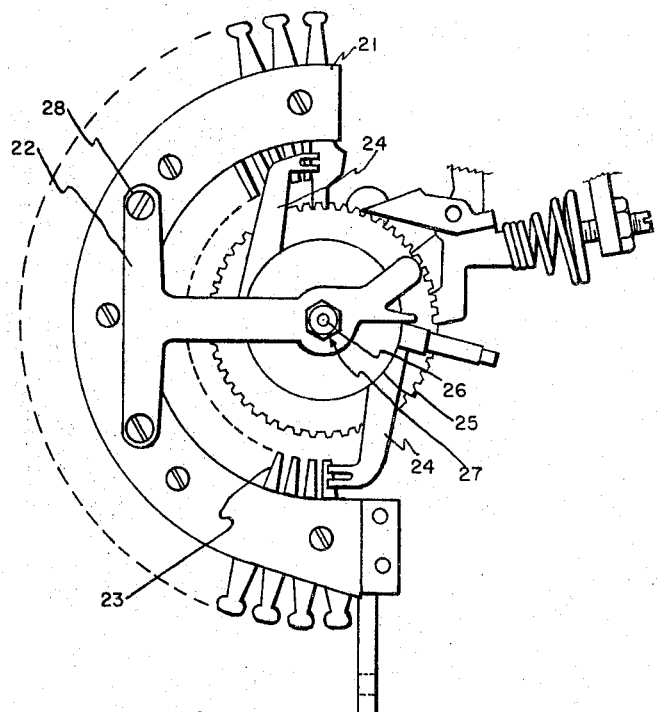
FIG. 2 is a side elevational view, in part, of a rotary stepping switch according to the invention having adjustable means for keeping the axial play of the wiper assembly along the rotary shaft within desired limits.
Figure 3:
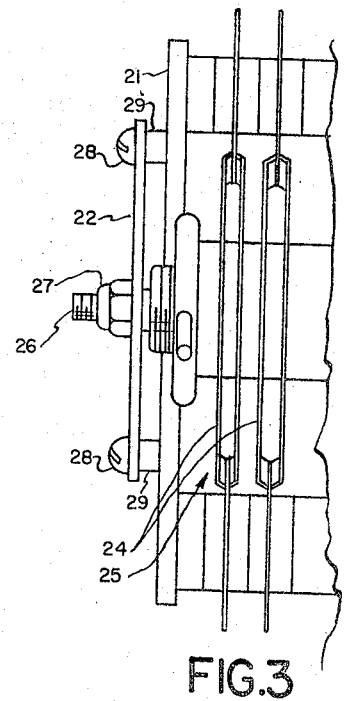
FIG. 3 is a front elevational view, in part, of the rotary stepping switch of FIG. 2.

FIGS. 2 and 3 show a rotary stepping switch in which the features according to the invention have been incorporated. For the remainder of the switch, reference again is made to the aforementioned article in the Automatic Electric Technical Journal. As can be seen from FIGS. 2 and 3, T-bracket 22 is mounted on contact bank 21 by screws 28 extending through mounting posts 29. Contact bank 21 is in turn mounted on the frame of the switch (not shown) in FIGS. 2 and 3 hereof. Contacts 23 protrude radially inwardly from contact bank 21 in a semicircle to be engaged by wipers 24 on wiper assembly 25 which rotates about stationary rotor shaft 26, also mounted on the switch frame (not shown). T-bracket 22 which is tensioned away from wiper assembly 25, fits over rotor shaft 26. Rotor shaft 26 has an extension reaching through and beyond T-bracket 22. A self threading lock nut 27 is placed on the free end of rotor shaft 26 to apply the desired pressure against T-bracket 22 which in turn determines the axial play of wiper assembly 25.

Figure 5:
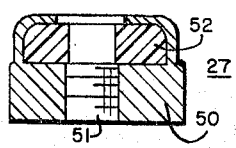
FIG. 5 is a sectioned view of a self threading lock nut used as locking means according to the invention to keep the adjusted axial play within the desired limits.

Self threading lock nut 27 is shown in greater detail in FIG. 5. Here it can be seen that the major portion 50 of nut 27 is made of metal, but held within metal portion 50, and surrounding aperture 51 is fibrous portion 52 which is not threaded.

Figure 4:
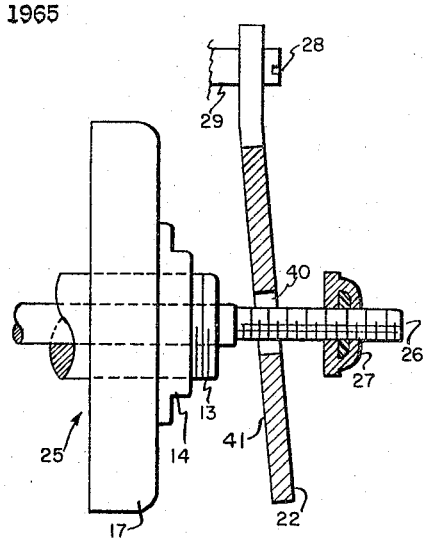
FIG. 4 is an enlarged sectioned top view, in part, of a rotary stepping switch, illustrating the invention in greater detail.

When nut 27 is tightened onto a threaded rod, such as rotor shaft 26, shown in FIG. 4, it engages easily until it reaches fibrous portion 52 where aperture 51 becomes smaller. As more pressure is exerted, nut 27 continues to engage rotor shaft 26 and fibrous portion 52 is cut into and threads are created therein. Nut 27 will remain locked when the desired position has been reached along threaded rotor shaft 26.

FIG. 4 shows in more detail the relation of T-bracket 22 and lock nut 27 to rotor shaft 26, and how they act to determine the axial play of wiper assembly 25.

A more detailed description of the invention will now be given by comparing FIG. 1 with FIG. 4.

Looking at FIG. 4, rotor shaft 26 has been lengthened and threaded to allow for its engagement by self threading lock nut 27 which can be tightened to any position along rotor shaft 26 and will remain locked in place thereon in the last-mentioned position. Undercut bushing 18 (FIG. 1) has been eliminated and T-bracket 22 has been provided with an aperture 40 which is large enough to allow rotor shaft 26 to be received therein and extend through and beyond. End surface 41 acts as a bearing between wiper assembly rotor shaft 13 and T-bracket 22.

The operation to provide a desired amount of axial play in the embodiment of the rotary stepping switch as shown in FIG. 4 is as follows: T-bracket 22, which is normally tensioned toward lock nut 27 and away from wiper assembly 25, is manually adjusted by tightening lock nut 27 so that end surface 41 on T-bracket 22 is tight against wiper assembly shaft 13. Then lock nut 27 is loosened approximately one quarter turn, to provide the desired axial play of wiper assembly 25 along rotor shaft 26.

If through operation of the switch, the structure changes and more or less axial play is needed, another simple adjustment can be made.

A self threading lock nut is preferred for locking the T-bracket in its adjusted position, however, other suitable locking means such as a double nut arrangement, for example, may be used to accomplish the desired result.

It will be obvious to those skilled in the art that changes and modifications may be made without departing from this invention in its broadest aspects and therefore the aim in the appended claims is to cover all such changes and modifications as in the true spirit and scope of this invention.

What is claimed is:
1. A rotary stepping switch comprising:
    a frame;
    a stationary shaft having one end rigidly secured to said frame;
    a wiper assembly rotatably mounted on said shaft and including a plurality of wipers;
    an arcuate bank assembly carried by said frame and disposed about said shaft, and including contact members for cooperating with said wipers;
    support means, at one end mounted on said bank assembly and having at its other free end, an aperture;
    the other free end of said shaft being received in and extending through and beyond said aperture for support by said support means;
    said support means also having an end surface surrounding said aperture for limiting the axial play of said wiper assembly depending on the axial adjustment of said support means;
    and setting means carried by the portion of the free end of said shaft which extends beyond said aperture of the support means; the free end of said support means being tensioned towards said setting means, in an outward direction longitudinally of said shaft, and said setting means being placed in a desired position along said shaft portion for axially adjusting and firmly locating said support means, thereby to adjust the axial end play of said wiper assembly.

2. A rotary stepping switch as claimed in claim 1, wherein said support means comprises a T-shaped bracket, the end of said bracket corresponding to the horizontal bar of said T being mounted on said bank assembly, and said aperture in said bracket being provided at the free end of the vertical bar of said T.

3. A rotary stepping switch as claimed in claim 1, wherein the free end of said shaft is threaded; and wherein said setting means includes a self threading lock nut engaging said threaded end of said shaft for axially adjusting said free end of the support means and for locking said support means in its adjusted position.

References Cited by the Examiner
UNITED STATES PATENTS

| | | | |
|---|---|---|---|
| 886,528 | 5/1908 | Marr | 248—7 X |
| 2,450,694 | 10/1948 | Sauer | 151—7 |
| 2,710,896 | 6/1955 | Graybill et al. | 200—105 |
| 3,086,096 | 4/1963 | McGee | 200—105 |
| 3,203,459 | 8/1965 | Coldren | 151—7 |

ROBERT K. SCHAEFER, *Primary Examiner.*

KATHLEEN H. CLAFFY, *Examiner.*

J. R. SCOTT, *Assistant Examiner.*